United States Patent [19]

Fletcher et al.

[11] 4,131,949
[45] Dec. 26, 1978

[54] WORD PROCESSOR APPARATUS HAVING MEANS FOR RECORDING A TAB FUNCTION AS A SIGNAL INDICATIVE OF THE NUMBER OF SPACES TABBED

[75] Inventors: Steven J. Fletcher, Norristown; Jeffrey L. Wright, Philadelphia; Richard S. Davis, Blue Bell, all of Pa.

[73] Assignee: Sperry Rand Corporation, New York, N.Y.

[21] Appl. No.: 612,165

[22] Filed: Sep. 10, 1975

[51] Int. Cl.² .................. G06F 1/00; B41J 25/18
[52] U.S. Cl. ..................... 364/900; 400/64; 400/279
[58] Field of Search .......... 340/172.5; 445/1; 197/113, 176, 177, 178, 179, 19; 364/200 MS File, 900 MS File

[56] References Cited

U.S. PATENT DOCUMENTS

| 3,403,386 | 9/1968 | Perkins | 340/172.5 |
|---|---|---|---|
| 3,512,138 | 5/1970 | May | 340/172.5 |
| 3,613,083 | 10/1971 | DeSandre | 340/172.5 |
| 3,623,012 | 11/1971 | Lowry | 340/172.5 |
| 3,630,336 | 12/1971 | Johnson et al. | 197/113 |
| 3,780,846 | 12/1973 | Kolpek et al. | 197/113 |
| 3,823,805 | 7/1974 | Richards | 197/113 |
| 3,927,395 | 12/1975 | Kasaio | 197/177 |
| 3,952,852 | 4/1976 | Greek, Jr. | 197/176 |

*Primary Examiner*—James D. Thomas
*Attorney, Agent, or Firm*—Eugene T. Battjer; Sheldon Kapustin; William E. Cleaver

[57] ABSTRACT

A word processor system comprising a typewriter, a data storage unit, a tab stop register for storing signals representative of tab stops set on the typewriter and means for controlling the tab stop register to keep it aligned with the typewriter carrier during the course of typing including backspacing, carrier return and tabbing actions. Additional means responsive to tab command and tab stop signals is provided for recording a tab action in the data storage unit as a succession of encoded space signals equal to the number of typing positions to the next tab stop from the carrier position at the instant of the tab command.

11 Claims, 5 Drawing Figures

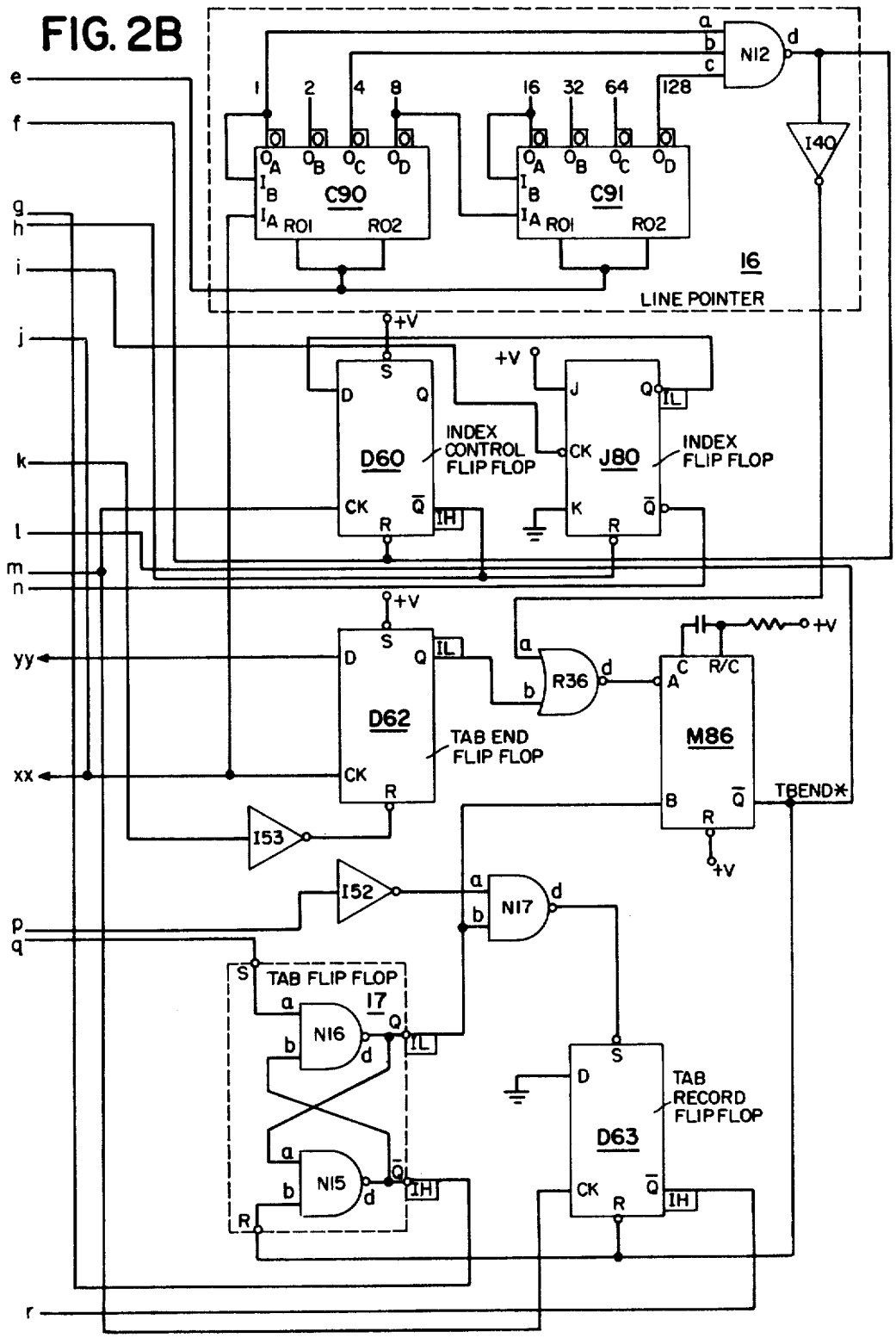

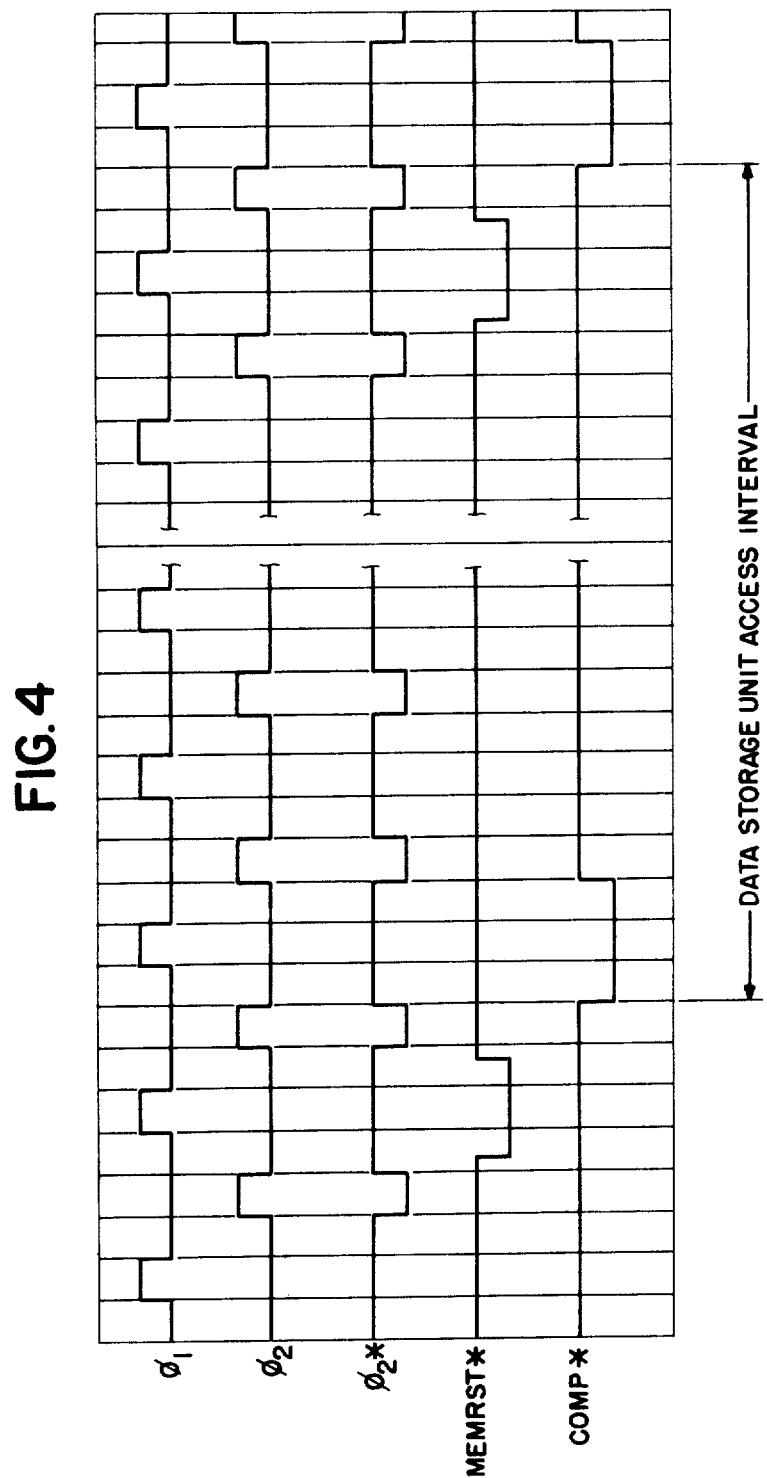

WORD PROCESSOR APPARATUS HAVING MEANS FOR RECORDING A TAB FUNCTION AS A SIGNAL INDICATIVE OF THE NUMBER OF SPACES TABBED

BACKGROUND OF THE INVENTION

1. Field of the Invention

The invention described herein relates to word processors and particularly to new and improved means for recording tab functions.

2. Description of the Prior Art

A word processor system generally comprises a data storage unit such as a magnetic recording medium or semiconductor memory and a typewriter serving as an input/output device to permit communication between the typewriter and storage unit. The system may be operated as a conventional typewriter or in various other modes, for instance, RECORD, PLAY, INSERT, DELETE and SKIP. In the RECORD mode, typed data may be printed on paper as in the case of conventional typewriter operation and simultaneously recorded in the data storage unit in the form of coded signals representative of the respective characters. In the INSERT and DELETE modes, new coded data signals may be inserted and original coded data signals deleted, respectively, at selected points in previously recorded data; and by means of the SKIP mode fast access may be obtained to the selected points for making the insertions and deletions. In the PLAY mode, the signals recorded in the data storage unit act to control the typewriter to print out the recorded data. The printout or playback is made in response to operator actuation of appropriate typewriter action keys, for example, CHARACTER, WORD, LINE and AUTO which function respectively to produce the playback on an individual character, word, line or block basis.

Other modes and actions in addition to those mentioned above are employed in various word processor systems as is well known in those skilled in the art. Moreover, the performance capabilities, uses and interrelationship of the various modes and actions are also well understood by those skilled in the art and thus for ease of explanation and understanding, the improvement afforded by the present invention will be explained only with reference to the RECORD and PLAY modes.

Typically, in the RECORD mode of operation the respective characters and format functions such as tab, space, backspace and carrier return are represented by unique digital encoded signals which are recorded in the data storage unit. In the case of a single element typewriter, for example, where the type characters are on a ball shaped member which moves along the typing line on a carrier mechanism and tilts and rotates in appropriate manner to print the various characters, an eight bit digital signal can represent each character or format action. A space function, for instance, may be represented by all zeros. For characters, two bits and four bits respectively can represent the tilt and rotation positions of the type element while a seventh bit indicates capital or lower case and the eighth bit indicates whether the type is to be underlined. Other unique eight bit signals can be used to represent format actions such as tab, backspace and carrier return.

An operator tab command, which causes the typewriter carrier mechanism to move rapidly to the right from its instant position to the next tab stop, is customarily recorded in presently available word processors as a unique digital signal which functions subsequently during playback to cause a tabbing action of the typewriter carrier mechanism. Recording in this manner does not assure preservation of text format on playback. If the typewriter tab stops are located at the same position for both recording and playback and no insertions or deletions are made in the storage unit at a point preceding a recorded tab command signal, the playback text format will indeed be the same as that which was recorded. On the other hand, if the tab stop locations are different during playback from those used during recording, the text format will not be preserved, that is, playback format will be different from what was recorded. Moreover, even if the tab stops are the same, the text format will not be preserved if the location of recorded tab command signals in the data storage unit as been materially altered by insertions or deletions. In any case, the change in text format occurs for the simple reason that tab command is recorded as an encoded tab function signal which provides a predetermined tab instruction to the typewriter during playback, independent of and without any regard to the instant position of the carrier or present location of tab stops.

SUMMARY OF THE INVENTION

The present invention overcomes the problem of text format changes which may occur when performing tab functions by the provision of means for storing signals representative of the tab stop positions and further means which coacts with the tab stop position signal storing means such that in the RECORD mode an operator tab command is recorded in the data storage unit as a succession of identical digital encoded signals each representative of a space. In other words, both tab commands and space commands are recorded as encoded space format signals. Therefore, during playback both tabbing and spacing can be performed simply as an appropriate number of space actions. As a result, the printout will be independent of the tab stop positions during playback and will not be affected by any insertions or deletions that may have been made in the recorded data prior to playback.

As an example of the operation of the invention, consider the following situation in which the system is first operated in the RECORD mode and then in the PLAY mode. In the RECORD mode, assume that a tab stop is located at the tenth position along the typing line and that the tab key is actuated when the carrier is located at the left margin following a carrier return for which an encoded carrier return signal has been recorded in the data storage unit. In response to the actuation of the tab key, the carrier tabs over nine positions from the left margin to the tenth position along the typing line and a space format signal is recorded in each of nine successive data storage locations following the locations containing the carrier return signal. Then when the operator commences typing characters, encoded character signals representative thereof are stored in respective succeeding storage locations. Thereafter, when the system is operated in the PLAY mode, if the tab stop has been cleared at the tenth typing position and a new tab stop has been set at say the fiftieth typing position, the characters recorded in storage will still be printed out starting at the tenth position from the left margin because after the carrier returns to the left margin in response to the recorded carrier return signal, it then spaces in to the tenth position and begins to type the characters represented by the encoded signals in the succeeding data storage locations. On the other hand, if the tab stop were retained at the tenth position and a new tab stop had been set at say the fifth position, the carrier after returning to the left margin would first space successively to the fifth position and then continue to space successively to the tenth position. Text format would obviously be preserved in the same manner if the new tab stop had been set at any other typing position irrespective of whether the original tab stop had been cleared or retained.

BRIEF DESCRIPTION OF THE DRAWINGS

FIG. 2a and 2b are logic drawings of the register timing and control unit shown in FIG. 1.

FIG. 4 depicts signal waveforms which are useful for obtaining an understanding of the operation of the invention.

DESCRIPTION OF THE PREFERRED EMBODIMENT

Figure 1:
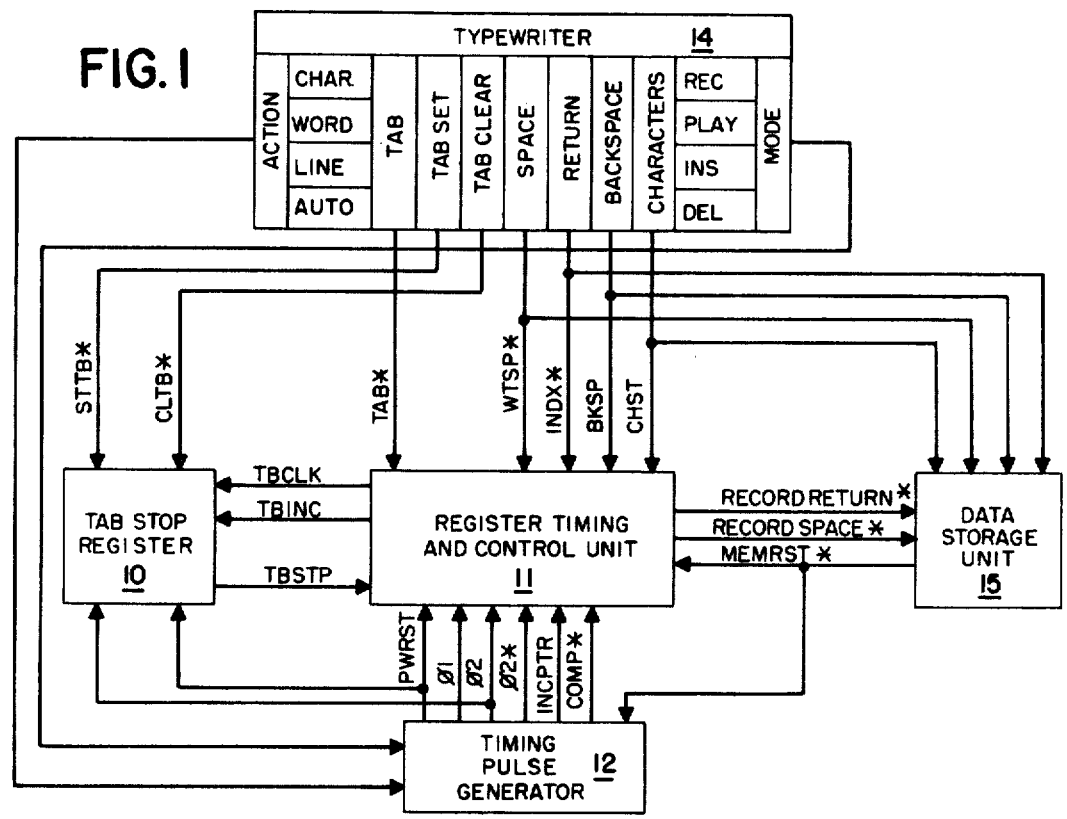
FIG. 1 is a block diagram of apparatus constructed in accordance with the principles of the invention.

To facilitate the understanding of the invention, the detailed description is divided into the following sections:
Definitions of Signals
General System Description
Circuit Conditions at Power Turn-On
Tab Stop Signal Recording in Tab Stop Register
Carrier Return Operation
Backspacing Operation
Tab Command Recording in Data Storage Unit

Definitions of Signals

The following alphabetically ordered list of definitions of operational signals mentioned hereinafter in describing the invention is provided for convenience of reference and ease of understanding in reading the detailed description of the preferred embodiment. An asterisk (*) at the end of the associated letters indicates that the particular signal is active when negative going or at a low level and conversely the absence of an asterisk indicates a signal which is active when positive going or at a high level.

BKSP - a signal produced in response to actuation of the typewriter backspace key for decrementing the tab stop register one position, except when the carrier is at the left margin.

CHST - a character strobe signal produced in response to actuation of a typewriter character key for incrementing the tab stop register one position.

CLTB* - a signal produced in response to actuation of the typewriter clear tab key and operative for clearing a tab stop signal from the tab stop register at a position corresponding to the instant position of the carrier.

COMP* a synchronization pulse produced at the data storage unit access rate.

INCPTR - a positive pulse produced once each time the space or carrier return mechanism is actuated, once each time a character is printed and once for each type position passed over during a tab action.

INDX* - a signal indicating that the typewriter is performing an indexing operation with accompanying carrier return to the left margin.

MEMRST* - a reset pulse produced at the data storage unit access rate.

PWRST - a master reset signal which is active for a predetermined time for setting the circuits when power is turned on.

RECORD RETURN* - a signal produced in response to an action of the carrier indexing and returning to the left margin for recording an encoded carrier return signal in the data storage unit under the appropriate condition of the data storage unit control circuits, for example, when the system is operating in a RECORD mode.

RECORD SPACE* - a signal produced in response to a spacing action of the typewriter for recording an encoded space signal in the data storage unit under the appropriate condition of the data storage unit control circuits, for example, when the system is operating in a RECORD mode.

STTB* - a signal produced in response to actuation of the typewriter set tab key and operative for recording a tab stop signal in the tab stop register at a position corresponding to the instant position of the carrier.

TAB* - a signal produced in response to actuation of the typewriter tab key for indicating that the typewriter is performing a tab function.

TBCLK - a tab clock signal supplied to the tab stop register for decrementing thereof in response to an operator backspace command.

TBEND* - a tab end signal indicating that the system has completed a tab function.

TBINC* - a tab increment signal indicating that the tab stop register is being incremented.

TBSTP - a tab stop signal provided by the tab stop register indicating that a tab stop is set at the next typing position.

WTSP* -a write space signal produced in response to actuation of the typewriter space bar for incrementing the tab stop register one position.

General System Description

Referring to the drawings and particularly FIG. 1, apparatus embodying the principles of the invention comprises a tab stop register 10, a register timing and control unit 11, a timing pulse generator 12, typewriter 14 and a data storage unit 15 including encoder and storage control circuits.

Timing pulse generator 12 includes a clock pulse source for providing the system clock pulses 01 and 02 and further includes standard gates, time delays and counters assembled in conventional fashion for deriving the 02* clock pulses and other indicated timing signals from the system clock pulses.

Generally, it is recommended that tab stops be set while operating in the conventional typewriter mode and before typing is commenced. From the following description it will be appreciated, however, that this is not an essential requirement. The tab stops may be set or cleared while operating in any mode.

As an example of the system operation in setting a tab, assume that the typewriter carrier is initially located at the left margin and that it is desired to set a tab stop at the tenth position along the typing line before the operator switches into the RECORD mode and commences typing. Actuation of the typewriter space bar nine times in succession causes the carrier to move to the tenth position along the typing line whereat the tab stop is set by actuation of the typewriter tab set key. As the carrier moves from the left margin to the tenth position, a WTSP* signal is produced for each actuation of the space bar. The WTSP* signal acts by way of register timing and control unit 11 to produce a signal which functions to increment tab stop register 10 in step with the typewriter carrier. When the tab stop is set by actuation of the tab set key, an STTB* signal is loaded into the first stage of the tab stop register as representative of the tab stop at the tenth typing position. In the illustrative embodiment of the invention described herein, the tab stop register has 133 discrete storage stages corresponding to 133 discrete typing positions along each typing line. The register is of the static shift type in which the signals stored in the respective stages are shifted into the succeeding stage each time the register is clocked. Hence, after the tab stop signal representative of the tab stop at the tenth typing position is loaded into the first stage of the tab stop register, it steps through the register stages as the carrier moves along the typing line. When the carrier has incremented 123 additional positions to the one hundred thirty-third position on the typing line, the tab stop signal has stepped 123 times and is located in the one hundred twenty-fourth stage of the tab stop register. As the carrier indexes and returns to the left margin, the tab stop signal steps to the one hundred twenty-fifth stage. Then, as the carrier increments to the right again until it reaches the ninth typing position, the tab stop signal continues to step and reaches the one hundred thirty-third stage of the tab stop register where it is provided as an output signal indicative of a tab stop at the tenth typing position. The operation is the same for the setting of additional tab stops irrespective of the relative locations of the tab stops or the order in which they are set, because alignment of the tab stop register with the carrier is esatblished once the first tab stop is set.

If typewriter character keys are actuated instead of the space bar to move the carrier to the tenth position from the initial position at the left margin, a CHST signal is operative to increment the tab stop register in the same manner as the WTSP* signal. A tab stop may be cleared from the typewriter in the conventional manner by locating the carrier at the position of the stop and then actuating the tab clear key. This action produces a CLTB* signal which removes the related tab stop signal from the tab stop register.

Now, with a tab stop set at the tenth position from the left margin and a corresponding tab stop signal stored in the tab stop register, consider how the system responds to an operator tab command for recording the tab command in the data storage unit when operating in the RECORD mode; and for simplicity of explanation, assume again that the carrier is initially at the left margin. From the foregoing explanation of the setting of the tab stops, it is understood that the tab stop register is maintained in alignment with the carrier and it must also be understood that the data storage unit is likewise maintained in alignment with the carrier. This is accomplished by incrementing the data storage unit in step with the tab stop register such that respective storage locations are accessed successively for recording therein. In the illustrative embodiment of the invention, various timing signals such as COMP* and MEMRST* are generated at a nine millisecond rate, referred to as the data storage unit access rate, commencing at or shortly after each incrementing of the data storage unit. Actuation of the typewriter tab key produces a TAB* signal which activates the register timing and control unit to be responsive to the MEMRST* and COMP* signals to produce RECORD SPACE* signals at the data storage unit access rate, that is, once every nine milliseconds, until a TBSTP signal is provided at the output of the tab stop register. Each RECORD SPACE* signal produces a digital encoded signal representative of a space action which is recorded in a respective storage location of the data storage unit. During the time that the MEMRST* pulses are active, an INCPTR pulse is supplied to the register timing and control unit to gate a TBINC pulse to the tab stop register once each data storage cycle. The foregoing action continues until the TBSTP signal representative of the tab stop at the tenth position is supplied from the tab stop register to terminate the foregoing operation of the register timing and control unit, at which time nine successive space signals have been recorded in data storage unit 15, the tab stop register has been incremented nine positions, and the carrier is at the tenth position along the typing line. Thus, positional alignment is maintained between the carrier, the tab stop register and the data storage unit and the tab command has been recorded in the data storage unit as a succession of encoded space signals.

The function of the remaining signals shown in FIG. 1 will become apparent from the subsequent description given with reference to the logic drawings which, it will be noted, include a plurality of logic elements, namely, NAND gates, NOR gates, inverters, D flip flops, JK flip flops, monostable multivibrators, binary counters and a static shift register identified by numeral legends prefaced respectively by the letters N, R, I, D, J, M, C and S. These elements operate basically as follows:

A NAND gate is characterized by a low output signal when all input signals are high, and by a high output signal when any input signal is low.

A NOR gate is characterized by a low output signal when either or both input signals are high and by a high output signal when both input signals are low.

A D flip flop is characterized by normally opposite signal levels at the Q and $\bar{Q}$ terminals. The S or R terminals attains dominant control when a low signal is applied thereto providing a high level signal at the Q or $\bar{Q}$ terminal respectively. The presence of low level signals simultaneously at both the S and R terminals produces high level signals at both Q and $\bar{Q}$ terminals. When the signal level at both the S and R terminals is high, a positive going signal applied to the clock terminal causes the signal level at the D terminal to be presented at the Q terminal. The signal level at the Q or $\bar{Q}$ terminal after power turn-on is represented in the drawings by the legend IH for initially high and IL for initially low.

A JK flip flop is also characterized by normally opposite signal levels at the Q and $\bar{Q}$ terminals. The R terminal attains dominant control when a low signal is applied thereto providing a high level signal at the $\bar{Q}$ terminal. In the absence of a low level signal at the R terminal, a negative going signal applied to the clock terminal produces one of the following conditions:

(a) no change in the signal at the Q terminal when both the J and K input signals are low (b) a high level signal at the Q terminal when the J input signal is high and the K input signal is low (c) a high level signal at the $\bar{Q}$ terminal when the J signal is low and the K input signal is high (d) a change (toggle) of the signal at the Q and $\bar{Q}$ terminals when both the J and K input signals are high. The signal level at the Q or $\bar{Q}$ terminal after power turn on is represented in the drawings by the legend IH for initially high and IL for initially low.

A monostable mulitivibrator is characterized by normally opposite signal levels at the Q and $\overline{Q}$ terminals with the $\overline{Q}$ terminal normally at a high level. A high level signal at the Q terminal and a low level signal at the $\overline{Q}$ terminal is produced for a predetermined interval whenever any of the following input conditions occurs:

(a) a low going signal at the A input when both the B and R inputs are high (b) a high going signal at the B input when the A input is low and the R input is high (c) high going signal at the R input when the A input is low and the B input is high.

The timing interval is determined by the value of the resistive and capacitive components connected to the R/C and C terminals.

A binary counter counts each signal pulse applied to an input terminal $I_A$ so that the signal at an output terminal $O_A$ represents a count of 1 for one signal level and a cound of zero for another signal level. The signals at outputs $O_B$ $O_C$ and $O_D$ represents counts of 2, 4 and 8 respectively for the one signal level and zero for the other signal level. Two such counters can be cascaded so that output $O_A$ of the second counter represents a count of 16 for the one signal level and zero for the other signal level and likewise outputs $O_B$, $O_C$ and $O_D$ represent counts of 32, 64 and 128 respectively for the one signal level and zero for the other signal level. A zero count at power turn-on is represented in the drawings by the legend O adjacent each input terminal. The legends 1, 2, 4, 8, 16, 32, 64 and 128 represent the count provided at each output when it switches from a O to a 1.

A static shift register operates such that data applied to its input terminal $I_A$ is shifted one stage in response to each pulse applied to its clock terminal. The first clock pulse therefore enters data at terminal $I_A$ into the first stage of the register and after a total of N pulses, where N is the number of stages in the register provides the same data at output terminal $O_A$.

Circuit Conditions at Power Turn-On

Figure 3:
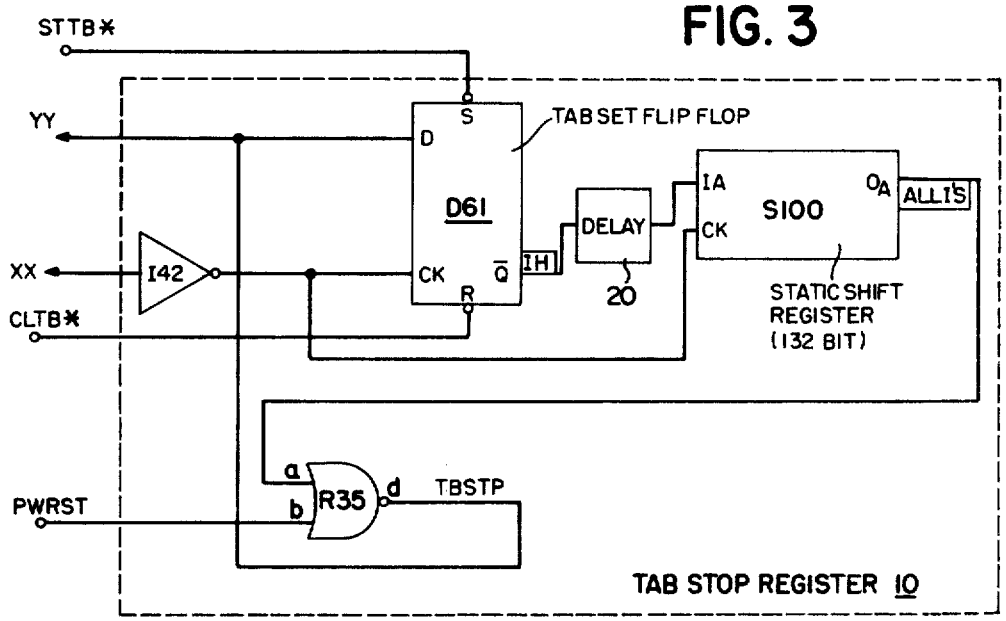
FIG. 3 is a logic drawing of the tab stop register shown in FIG. 1.
Figure 2A:
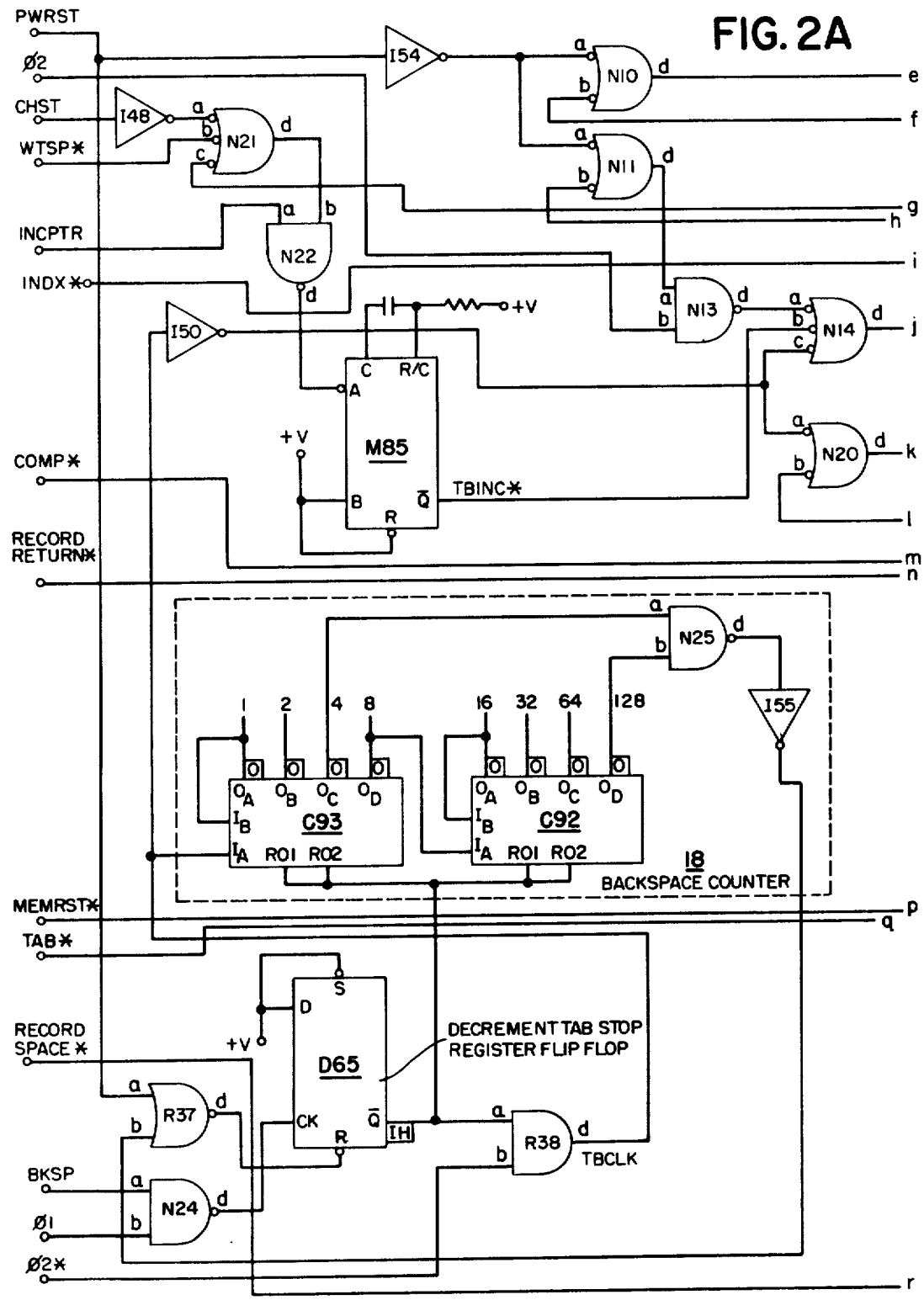

Referring now more particularly to FIGS. 2a and 2b and FIG. 3, when power is turned on, the PWRST signal goes high for a predetermined time of approximately 50 milliseconds, and is applied to an input terminal of NOR gate R35 driving the TBSTP signal low. The PWRST signal is also applied through inverter I54 to an input terminal of each of NAND gates N10 and N11 thereby driving the signals at output terminals N10-d and N11-d to a high level. The high level signal at terminal N10-d is applied to terminals $R_{01}$ and $R_{02}$ of counters C90 and C91 to reset them to binary count zero and disable the input $I_A$. Counters C90 and C91 together with NAND gate N12 comprise an 8-bit binary modular 133 line pointer 16. In operation of the system the line pointer is reset to zero and provides a low level signal at output terminal N12-d after every 133 pulses applied to input terminal $I_A$ of counter C90. The line pointer does not count; however, as long as high level signal is applied to the $R_{01}$ and $R_{02}$ terminals of the counters. Thus, at power turn-on low level signals are provided at the output terminals $O_A$ and $O_C$ of counter C90 and at terminal $O_D$ of counter C91 and applied to the input terminals of NAND gate N12 driving the signal level at output terminal N12-d high. The high level signal at terminal N12-d is applied to the reset (R) terminal of index control flip flop D60 enabling the clock (CK) input thereof.

As indicated in FIG. 4, a COMP* signal is provided once each access interval of data storage unit 15, which in the illustrative embodiment of the invention described herein is approximately nine milliseconds. Since the signal level at the reset terminal of flip flop D60 is high, the low to high transition of the COMP* signal applied to the clock terminal of flip flop D60 transfers the signal at the Q output of flip flop J80 through the D terminal of flip flop D60 to terminal D60-Q. If when power is first applied to flip flop J80, the signal at the Q output terminal thereof is high, then the signal at terminal D60-$\overline{Q}$ is driven low on a low to high transition of COMP*. The low level signal on terminal D60-$\overline{Q}$ is applied to the reset terminal of flip flop J80 driving the signal terminal J80-Q low. On the next low to high transition of the COMP* signal, the signal at terminal D60-$\overline{Q}$ is driven high, enabling the clock input of flip flop J80. If, however, when power is first applied to flip flop J80, the Q terminal thereof is low, then the signal at terminal D60-$\overline{Q}$ is driven high on a low to high transition of the COMP* signal. Once the signal at terminal J80-Q is low and that at terminal D60-$\overline{Q}$ is high, successive COMP* pulses have no effect on the output signal levels of flip flops J80 and D60. Thus, within a predetermined time interval the signal at the $\overline{Q}$ output terminal of flip flop J80 is driven high.

Since a RECORD RETURN* signal may be provided initially at terminal J80-$\overline{Q}$ of index flip flop J80, the circuit connection therefrom to the data storage unit is interrupted momentarily at power turn-on to preclude erroneous data recording. The circuit interruption is accomplished by means internal to the data storage unit to allow ample time for flip flops D60 and J80 to settle with the signal RECORD RETURN* at a high level.

The high level signal produced at terminal N11-d at power turn-on is applied to NAND gate N13 to gate positive clock pulses 02 therethrough for application via NAND gate N14 and inverter I42 to the clock terminals of tab set flip flop D61 and static shift register S100. The positive going trailing edges of the pulses applied to the clock terminal of tab set flip flop D61 drive terminal D61-$\overline{Q}$ high because of the low TBSTP signal which is applied to terminal D61-D. This initial high level signal produced at tab set flip flop terminal D61-$\overline{Q}$ is applied through delay network 20 to present a high level signal representative of a one at input terminal $I_A$ of register S-100. As a result of the high signal level at the input terminal of the register, pulses applied to the clock terminal cause all the stages thereof to set to one after 132 pulses. The PWRST signal is active for a period longer than 133 02 pulses so the foregoing operation is assured. The static shift register S100, tab set flip flop D61 and delay network 20 comprise the tab stop register 10 which has a total of 133 stages, the first stage being provided by the tab set flip flop and the other 132 stages provided by the static shift register. The signal at output terminal S100-$O_A$ of register S100 is applied to an input terminal of NOR gate R35 to permit recirculation of the tab stop register data.

The positive pulses produced at terminal N14-d, by virtue of clock pulses 02 being gated through NAND gates N13 and N14, are applied to the input terminal C90-$I_A$ of line pointer 16 and to the clock terminal of tab end flip flop D62. The line pointer does not count though because of the high level signal applied to terminals R01 and R02 of counters C90 and C91, but terminal D62-Q of the tab end flip flop is driven to a low signal level because of the low TBSTP signal applied to terminal D62-D. The low signal at terminal D62-Q, in conjunction with a low level signal from the output of inverter I40, acts by way of NOR gate R36 to apply a high level signal to monostable multivibrator terminal M86-A. In the stable state, the $\overline{Q}$ output terminal of monostable multivibrator M86 is at a high level, but at power turn-on the $\overline{Q}$ terminal momentarily goes low for an interval determined by the time constant of the multivibrator. Hence, at power turn-on a TBEND* pulse is produced at terminal M86-$\overline{Q}$. The TBEND* pulse is applied to the reset terminal of tab record flip flop D63 driving the signal at terminal D63-$\overline{Q}$ high, and is also applied to an input terminal of NAND gate N15 which is cross-coupled with NAND gate N16 to form a tab flip flop 17. The low level TBEND* signal, when applied to gate N15, drives the signal at terminal N15-d high. The high level signal at terminal N15-d is applied to an input of NAND gate N16 driving the signal at output terminal N-16 low. The low level signal terminal at N16-d in turn is applied to an input of NAND gate N15, thus keeping the signal at terminal N15-d high and the signal at terminal N16-d low even after the TBEND* signal goes high.

Monostable multivibrator M85 also momentarily switches to the unstable state at power turn-on so the signal at terminal M85-$\overline{Q}$ goes to a low level. This momentary low level signal is applied to one of the input terminals of NAND gate N14 and is ineffective at this time.

The high level PWRST signal is also applied to an input terminal of NOR gate R37 driving the output terminal low. The low level signal at terminal R37-d is applied to the reset terminal of decrement tab stop register flip flop D65 driving the signal at the $\overline{Q}$ terminal thereof high. The high level signal at terminal D65-$\overline{Q}$ is applied to the R01 and R02 terminals of counters C92 and C93 thereby resetting them to binary count zero and disabling the clock inputs ($I_A$ and $I_B$).

Tab Stop Signal Recording in Tab Stop Register

At a predetermined time of about 50 milliseconds after power-turn-on, the PWRST signal becomes inactive and incrementing clock pulses are no longer applied to the tab stop register and line pointer as explained in the preceding section. Now the system is ready for operator typing. As spaces or characters are typed, the typewriter carrier moves incrementally from left to right in the usual manner, and at the same time the tab stop register is similarly incremented so as to track the carrier. This is accomplished by the CHST and WTSP* signals. A CHST signal is produced in response to each actuation of a character key, and a WTSP* signal is produced in response to each actuation of the space bar. The CHST signal is applied through inverter I48 to one input of NAND gate N21 and the WTSP* signal is applied directly to another input of NAND gate N21. The presence of a low level signal at either of the inputs of gate N21 produces a high level signal at output terminal N21-d which is connected to one input of NAND gate N22. The high level INCPTR pulse which occurs in response to each typewriter action, is supplied to the other input of gate N22 concurrently with the presence of the high level signal from output terminal N21-d, thereby producing a negative going pulse at terminal N22-d which is coupled to terminal M85-A of monostable multivibrator M85. The negative going signal at terminal M85-A momentarily drives the signal at terminal M85-$\overline{Q}$ low, producing a TBINC* signal to increment tab stop register 10. The incrementing of the tab stop register is performed by the low level TBINC* signal at terminal M85-$\overline{Q}$ feeding through NAND gate N14 and inverter I42 to clock tab set flip flop D61 and static shift register S100. For the condition where at tab stop has not yet been set, the high level signal provided at output terminal S100-O$_A$ and applied to an input terminal of NOR gate R35 forces the TBSTP signal low and therefore the signals at terminal D61-$\overline{Q}$ and the output of delay network 20 will be high so ones continue to be loaded into register S-100.

Now assume that the carrier has moved from a starting position at the left margin in incremental steps in response to actuation of the space bar or character keys so that it is presently at the tenth position along the typing line where it is desired to set a tab stop. As the carrier was incremented from the left margin, nine successive ones were loaded into the tab stop register because the TBSTP signal was constantly at a low level. The tab stop is set in the usual manner by actuating the tab set key. This action by the operator mechanically sets a tab stop on the typewriter and produces a low level STTB* signal which sets tab set flip flop D61 driving signals at terminal D61-$\overline{Q}$ and the output of delay network 20 to a low level. At the occurrence of the next spacing or character typing action, the carrier moves to the eleventh typing position and a zero is loaded into the first stage of the static shift register, which is the second stage of the tab stop register. Thus, with the carrier at the eleventh position, a zero in the first stage of the shift register is representative of a tab stop at the tenth position on the typing line. When the carrier has completed a typing line of 133 positions and returned to the left margin, the zero entered into the first stage of the shift register, as representative of the tab stop at the tenth position, is located in the 124th stage of the shift register or 125th stage of the tab stop register so it is eight positions from the 133rd or output stage of the tab stop register. When the carrier moves to the right again and arrives at the ninth typing position, the zero recorded in the tab stop register reaches the output stage at terminal S100-0$_A$. The low level signal at output terminal S100-0$_A$ is applied through gate R35 to drive the TBSTP signal high. Hence, a tab stop signal provided at the output of the tab stop register is indicative of a tab stop at the next carrier position. From the foregoing explanation, it should now be understood how the tab stop register is incremented whenever a space or character operation occurs at the typewriter and it should also be understood how signals representative of tab stops are recorded in the tab stop register whenever the tab set key on the typewriter is actuated.

A tab stop may be mechanically cleared from the typewriter and the signal representative thereof removed from the tab stop register simply by moving the carrier to the position where the tab stop is to be cleared and then actuating the tab clear key. Thus, to clear a tab stop at the tenth position from the left margin, the carrier is moved to the tenth position. Under this condition, the zero representative of the tab stop is located in the first stage of the tab stop register, that is, terminal D61-$\overline{Q}$ of the tab set flip flop D61 is at a low level. Actuation of the tab clear key on the typewriter produces a low level CLTB* signal which resets tab set flip flop D61 driving the signals at terminal D61-$\bar{Q}$ and the output of delay network 20 to a high level. Then as typing resumes and the carrier increments to the next position, a one is loaded into the first stage of the static shift register in place of the zero which would have been loaded there if the tab stop had not been cleared.

It will be noted that the pulses supplied at the output of NAND gate N14 for clocking the tab stop register are also supplied to the input terminal C90-$I_A$ of line pointer 16. As explained in the preceding section, the line pointer is initially set to zero at power turn-on and is reset to zero after every 133 pulses applied to its input terminal since a low level signal is produced at output terminal N12-d after the one hundred thirty-third input pulse and is applied through gate N10 to drive the reset inputs $R_{01}$, $R_{02}$ of counters C90 and C91 high. Therefore, as the carrier increments to the right, the line pointer counts the number of positions which the carrier has incremented so that it contains a count indicative of the carrier position along the typing line. The necessity for this information will become apparent from a reading of the immediately following section.

Now that the recording of tab stop signals in the tab stop register and the operation of the tab stop register and line pointer in the course of operator typing is understood, the operation of the system in response to an operator tab command can be considered, but first an explanation will be provided in the following two sections of the manner in which the tab stop register is maintained in alignment with the carrier during carrier return and backspace actions.

Carrier Return Operation

Each time the carrier returns to the left margin, the typewriter indexing mechanism operates producing a low level INDX* signal which is applied to the clock terminal of index flip flop J80 causing the signal at terminal J80-Q to go high because of the +V clamping voltage applied to terminal J80-J and the GND applied to terminal K. At the same time, the signal at terminal J80-$\bar{Q}$ goes low producing a RECORD RETURN* signal. When the system is operating in a recording mode, the low level RECORD RETURN* signal is encoded and recorded in the data storage unit as a unique digital signal representative of a carrier return action for use during playback operation. The high level signal on terminal J80-Q is applied to terminal D60-D of index control flip flop D60, so when the trailing edge of the next COMP* signal clocks flip flop D60, the signal at terminal D60-$\bar{Q}$ goes low resetting index flip flop J80 and driving the signal at terminal N11-d high. Under this condition, 02 clock pulses are fed through NAND gates N13 and N14 to drive line pointer 16 and also through inverter I42 to clock tab stop register 10 in step with the line pointer.

The number of 02 clock pulses applied to the line pointer and tab stop register depends on where the carrier was located along the typing line when the carrier return was executed. Consider the case where the carrier is at the eightieth typing position when the carrier return is performed. In this instance, immediately before the carrier return, the line pointer count is 79 and the tab stop register is aligned with the carrier. When the typewriter carrier return key is actuated, the carrier rapidly returns to the left margin and 02 clock pulses are supplied to the line pointer and tab stop register as previously mentioned. Each 02 clock pulse increments the tab stop register and increases the line pointer count by one so to maintain alignment therebetween. In the meantime, since the carrier has rapidly returned to the left margin, the line pointer and tab stop register, although staying aligned with each other, momentarily lose alignment with the carrier. When the line pointer count reaches 133, all three inputs at NAND gate N12 are high producing a low signal at terminal N12-d which in turn drives the signal at the output of gate N10 high to reset counters C90 and C91 to zero. The low level signal at terminal N12-d also resets index flip flop D60 so the signal at terminal D60-Q goes high and interrupts the supply of clock pulses to the line pointer and tab stop register.

The result of the above described action is that as the carrier flys back to the left margin in response to the carrier return command, the line pointer and tab stop register are incremented at the clock pulse rate of once every two microseconds until the line pointer count reaches 133, at which time the line pointer and tab stop register are again aligned with the carrier in readiness for left-to-right carrier motion along the next line.

Backspace Operation

When a backspace action occurs at the typewriter, the line counter and tab stop register must decrement one step to stay aligned with the carrier. Since the line counter and the tab stop register cannot be decremented directly, the equivalent of a decrementing action is performed by incrementing both the line pointer and the tab stop register a full cycle minus one increment, that is 132 increments. This is accomplished as follows. Actuation of the backspace mechanism produces a high level BKSP signal, except when the carrier is already at the left margin, which is applied to one input of NAND gate N24. 01 clock pulses are applied to the other input of gate N24 thereby producing negative clock pulses at terminal N24-d. The trailing edge of the first negative pulse clocks decrement tab stop register flip flop D65 driving the signal low at terminal D65-$\bar{Q}$ which is coupled to one input of NOR gate R38. NOR gate R38 performs an AND function in response to the simultaneous presence of the 02* clock pulses at its other input to produce positive TBCLK pulses at the system clock rate at terminal R38-d. The TBCLK pulses are applied directly to the input terminal C93-$I_A$ of backspace counter 18 and through inverter I50 and NAND gate N14 to the input C90-$I_A$ of line pointer 16 and also through inverter I42 to clock tab stop register 10. Thus, the tab stop register is incremented and the line pointer and backspace counters count at the system clock rate until the backspace counter reaches a count of 132 of which time both inputs to NAND gate N25 are high driving the signal at terminal N25-d low. The low level signal at terminal N25-d is applied through inverter I55 and gate R37 to reset decrement tab stop register flip flop D65 so the signal at terminal D65-$\bar{Q}$ goes high, thereby terminating the generation of TBCLK pulses. The TBCLK pulses, while being generated, are also applied through inverter I50 to an input of NAND gate N20 driving the signal at output terminal N20-d high. The high level signal at terminal N20-d is applied through inverter I53 which provides a slight delay so that tab end flip flop D62 is reset driving the signal at terminal D62-Q low when the backspace operation is complete. From the foregoing explanation, it should be appreciated that when a backspace command is executed at any position of the carrier along a typing line, 132 TBCLK pulses are generated under control of backspace counter 18 and associated logic elements so as to increment the tab stop register and line pointer 132 positions while the carrier decrements one space, whereby alignment of the tab stop register and line pointer with the carrier is maintained.

Tab Command Recording in Data Storage Unit

In this section an explanation is provided of the manner in which a tab command is recorded in the data storage unit in response to operator actuation of the typewriter tab key when operating in a recording mode.

Pursuant to the previous description wherein it was explained how a tab stop was set at the tenth position, assume now that the carrier is at the left margin and the operator desires to tab to the stop set at the tenth position. Assume further that no other tab stops were set. Actuation of the typewriter tab mechanism produces a momentary low level TAB* (tab format) signal which is applied to input terminal N16-a of tab flip flop 17. The low level TAB* signal drives the signal at terminal N16-d high. The positive going edge of the signal provided at terminal N16-d when applied to terminal M86-B has no affect on the monostable output since the signal at terminal M86-A is high at this time. Once every nine milliseconds a MEMRST* pulse is produced. The MEMRST* is supplied to the input of inverter I52 producing a high level signal at the output thereof which combines with the high level signal from terminal N16-d to drive the output of NAND gate N17 low. The low level signal at terminal N17-d sets tab record flip flop D63 causing the signal at terminal D63-$\bar{Q}$ to go low and thereby producing a RECORD SPACE* signal which is encoded as a digital signal representative of a space and recorded in the instant accessed storage location of the data storage unit during the next COMP* pulse. The trailing edge of the next COMP* signal following a MEMRST* signal clocks tab record flip flop D63 driving the signal at terminal D63-$\bar{Q}$ high. The foregoing action is repeated at the data storage unit access rate, that is every nine milliseconds until the signal at output terminal N16-d is driven low, which occurs whenever a tab stop signal is provided at the output terminal of the tab stop register as described in the following paragraph. Hence, nine successive RECORD SPACE* signals are produced and spaced code signals are recorded in nine successive storage cells, one space code signal being recorded for each typing position the carrier moves while tabbing.

In addition to recording space code signals in the data storage unit while tabbing, provision is made for incrementing the line pointer and tab stop register to keep them aligned with the carrier. It is not necessary, however, that the line pointer and tab register be incremented synchronously with the carrier. It is sufficient merely that the line pointer and tab stop register be aligned with the carrier in readiness for the next action to be preformed following the tab action. This is accomplished in the following manner. When the signal at terminal N16-d is high in response to the TAB* signal, a low level signal is produced at terminal N15-d. The low level signal at terminal N15-d is applied to input terminal N21-c of NAND gate N21 driving the signal at terminal N21-d high. The high level INCPTR pulse, which occurs in response to each carrier print position tabbed over during a typewriter tab operation, is supplied to gate N22 concurrently with the high level signal from terminal N21-d thereby producing a negative going pulse at terminal N22-d. Since the signal at terminal M85-B is high, the negative going signal applied to terminal M85-A of monostable multivibrator M85 drives the signal at terminal M85-$\bar{Q}$ low momentarily so that a pulse is supplied through NAND gate N14 to clock tab end flip flop D62 and increment line pointer 16 and tab stop register 10. The foregoing action is repeated with the tab end flip flop being clocked and the line pointer and tab stop register being incremented at the data storage unit access rate upon the occurrence of each INCPTR signal until a low level tab stop signal appears at the output terminal S100-$O_A$ of the tab stop register. This low level signal is applied through gate R35 to produce a high level TBSTP signal which is applied to terminal D62-D of the tab end flip flop D62. On the leading edge of the next clock (inverted TBLNC*) pulse applied to the clock terminal of the tab end flip flop D62, the signal at terminal D62-Q goes high producing a low level signal at the output of NOR gate R36. Since the signal at terminal M86-B is high at this time, the negative going edge of the signal provided at terminal R36-d triggers multivibrator M86, thereby providing a low level TBEND* signal at terminal M86-$\bar{Q}$. The low level TBEND* signal resets tab flip flop 17, that is, drives terminal N15-d high and output N16-d low. The TBEND* signal also resets tab record flip flop D63 driving the signal at terminal D63-$\bar{Q}$ high and is applied through NAND gate N20 and inverter I53 to reset tab end flip flop D62 so the signal at terminal D62-Q goes low when the tab operation is complete.

In the event no tab stops are set, the carrier will move along the typing line to the far right margin at which time the line pointer reaches a count of 133 and provides a high level signal at the output of inverter I40. The high level signal from inverter I40 is applied through NOR gate R36 to produce a low level TBEND* signal which resets the various elements as explained above. The result, therefore, of the circuit response to a TAB* signal is to record a space code signal in the data storage unit for each typing position traversed by the carrier until a tab stop is reached, while simultaneously incrementing the line pointer and tab stop register to reestablish alignment thereof with the carrier at completion of the tabbing action, at which time tab flip flop 17, tab record flip flop D63 and tab end flip flop D62 are reset.

While the invention has been described with reference to a specific embodiment, it will be apparent that improvements and modifications may be made within the purview of the invention without departing from the true spirit and scope thereof as defined in the appended claims.

We claim:

1. Word processor apparatus comprising:
input means for providing input character signals representative of characters to be written and input format signals for controlling the arrangement of the characters when written,
means for storing the input character and format signals,
output means responsive to the character and format signals stored in said storage means for respectively writing characters and controlling the arrangement thereof, and
tab signal recording means including tab stop signal storage means for storing one or more signals each representative of a respective tab stop position along a writing line, control means for controlling the tab stop signal storage means such that a signal stored therein is representative of the next tab stop position along a line relative to the instant writing position, and means responsive to a tab input format signal supplied from the input means and a signal supplied from the tab stop signal storage means representative of the next tab stop position from the instant writing position at the occurrence of the tab input format signal for generating and storing in said storage means a succession of encoded space format signals corresponding to the number of writing positions to the next tab stop position from the instant writing position.

2. The apparatus of claim 1 wherein the control means comprises line pointer means including a line pointer counter for storing a signal indicative of the instant writing position relative to a margin position.

3. The apparatus of claim 2 wherein the control means further includes means responsive to an input format signal supplied from the input means for changing the instant writing position from a position on one writing line to a margin position on the next writing line and setting the line pointer counter to a reference signal representative of said margin position.

4. The apparatus of claim 3 wherein the control means further comprises means responsive to character signals and space input format signals supplied from the input means for incrementing the instant writing position one position along the writing line and uniformly changing the signal of the line pointer counter to be indicative of successive writing positions along the writing line.

5. The apparatus of claim 4 wherein the control means further includes means responsive to a backspace input format signal supplied from the input means for decrementing the instant writing position one position along the writing line and changing the signal of the line pointer counter to be indicative of the writing position one position from the writing position at the instant of the backspace input format signal.

6. The apparatus of claim 5 wherein the tab input format signal and tab stop position signal responsive means is responsive to the tab input format signal to initiate generation of encoded space format signals and responsive to the tab stop position signal to terminate the generation of the encoded space format signals.

7. The apparatus of claim 6 wherein the backspace input format signal responsive means comprises a backspace counter for counting to a count one less than the number of discrete writing positions along the writing line, and means coupling said backspace input format signal responsive means to said line pointer counter for changing the count in the line pointer counter to a count one less than the count at the instant of the backspace input format signal.

8. The apparatus of claim 1 wherein the tab stop signal storage means comprises a circulating shift register having a plurality of stages corresponding to the maximum number of discrete writing positions along a writing line, said shift register operating such that a tab stop signal located in the first stage is representative of a tab stop at the instant writing position and increments through the register to the last stage to provide an output signal thereat when the related tab stop is located at the next writing position from the instant writing position.

9. The apparatus of claim 8 wherein the control means comprises:
a line pointer counter for storing a count indicative of the instant writing position from a margin position, and
means responsive to an input format signal supplied from the input means for resetting the line pointer counter to a reference count representative of the margin position and simultaneously incrementing the shift register a plurality of times equal to one plus the difference between the maximum number of writing positions along the writing line and the number corresponding to the writing position at the instant of the input format signal resetting the line pointer counter to the reference count.

10. The apparatus of claim 9 wherein the control means further comprises:
a backspace counter responsive to a backspace input format signal supplied from the input means for counting to a count one less than the number of discrete writing positions along the writing line, and
means coupled to the backspace counter for simultaneously changing the count in the line pointer counter and incrementing the shift register one less than the number of discrete writing positions along the writing line.

11. The apparatus of claim 10 wherein the control means further comprises means responsive to each character signal and each space input format signal supplied from the input means for uniformly incrementing the shift register and line pointer counter.

* * * * *